(12) United States Patent
Tsuji et al.

(10) Patent No.: US 12,391,288 B2
(45) Date of Patent: Aug. 19, 2025

(54) VEHICLE CONTROL DEVICE, VEHICLE CONTROL METHOD, AND PROGRAM

(71) Applicant: HONDA MOTOR CO., LTD., Tokyo (JP)

(72) Inventors: Kanta Tsuji, Wako (JP); Noriyuki Imaeda, Tokyo (JP); Yoshifumi Nakamura, Wako (JP); Takashi Kishimoto, Tokyo (JP); Daiki Higuchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 17 days.

(21) Appl. No.: 18/023,390

(22) PCT Filed: Dec. 28, 2020

(86) PCT No.: PCT/JP2020/049088
§ 371 (c)(1),
(2) Date: Feb. 27, 2023

(87) PCT Pub. No.: WO2022/144952
PCT Pub. Date: Jul. 7, 2022

(65) Prior Publication Data
US 2023/0322272 A1    Oct. 12, 2023

(51) Int. Cl.
*B60W 50/00*    (2006.01)
*B60W 30/18*    (2012.01)
(Continued)

(52) U.S. Cl.
CPC .. *B60W 60/0053* (2020.02); *B60W 30/18163* (2013.01); *B60W 50/0205* (2013.01); *B60W 2420/403* (2013.01)

(58) Field of Classification Search
CPC ....... B60W 60/0053; B60W 30/18163; B60W 50/0205; B60W 2420/403; B60W 2540/223; B60W 30/10; B60W 50/035
See application file for complete search history.

(56) References Cited

U.S. PATENT DOCUMENTS

2016/0350298 A1*  12/2016  Ono ................. H04N 5/77
2017/0297587 A1   10/2017  Mimura et al.
(Continued)

FOREIGN PATENT DOCUMENTS

CN    109074730    12/2018
CN    109968978    7/2019
(Continued)

OTHER PUBLICATIONS

International Search Report and Written Opinion for International Application No. PCT/JP2020/049088 mailed on Mar. 16, 2021, 11 pages.
(Continued)

*Primary Examiner* — Khoi H Tran
*Assistant Examiner* — Tien Minh Le
(74) *Attorney, Agent, or Firm* — Amin, Turocy & Watson, LLP

(57) ABSTRACT

A vehicle control device of embodiments includes a recognizer configured to recognize a surrounding status of a vehicle, a driving controller configured to control one or both of steering and acceleration or deceleration of the vehicle on the basis of the surrounding status recognized by the recognizer or map information, a storage configured to store images of the surroundings of the vehicle captured by a peripheral camera mounted on the vehicle; and a storage controller configured to control the storage. The driving controller causes the vehicle to travel in one of a plurality of driving modes including a first driving mode and a second
(Continued)

| | DRIVING MODE | CONTROL STATE | TASK | |
|---|---|---|---|---|
| FIRST DRIVING MODE | MODE A | AUTOMATED DRIVING | FORWARD MONITORING:NOT REQUIRED STEERING GRIP:NOT REQUIRED | TASK:LIGHTEST ↑ |
| SECOND DRIVING MODE | MODE B | DRIVING ASSISTANCE | FORWARD MONITORING:REQUIRED STEERING GRIP:NOT REQUIRED | |
| | MODE C | DRIVING ASSISTANCE | FORWARD MONITORING:REQUIRED STEERING GRIP:REQUIRED | |
| | MODE D | DRIVING ASSISTANCE | FORWARD MONITORING:REQUIRED AT LEAST CERTAIN LEVEL OF DRIVING OPERATION IS REQUIRED | |
| | MODE E | MANUAL DRIVING | FORWARD MONITORING:REQUIRED STEERING, ACCELERATION OR DECELERATION, AND DRIVING OPERATION ARE REQUIRED | ↓ TASK:HEAVIEST | driving mode in which a task imposed on an occupant of the vehicle is greater than that in the first driving mode. The driving controller causes the vehicle to travel by switching from the first driving mode to the second driving mode when an abnormality has occurred in one or both of the peripheral camera and the storage in the first driving mode, and continues the second driving mode when an abnormality has occurred in one or both of the peripheral camera and the storage in the second driving mode.

12 Claims, 6 Drawing Sheets

(51) Int. Cl.
*B60W 50/02* (2012.01)
*B60W 60/00* (2020.01)

(56) References Cited

U.S. PATENT DOCUMENTS

| | | |
|---|---|---|
| 2018/0105184 A1 | 4/2018 | Urano et al. |
| 2019/0031202 A1* | 1/2019 | Takeda ................ B60T 8/17557 |
| 2019/0106120 A1* | 4/2019 | Hatano ................ B60W 50/082 |
| 2019/0286144 A1* | 9/2019 | Yasuda .................. G05D 1/021 |
| 2020/0086871 A1* | 3/2020 | Gotoda .................... G01S 17/42 |
| 2020/0307594 A1 | 10/2020 | Kato et al. |
| 2020/0307646 A1 | 10/2020 | Kato et al. |
| 2020/0339417 A1 | 10/2020 | O'Neal et al. |

FOREIGN PATENT DOCUMENTS

| | | |
|---|---|---|
| JP | 2011-123720 | 6/2011 |
| JP | 6035032 | 11/2016 |
| JP | 2016-224677 | 12/2016 |
| JP | 2018-062321 | 4/2018 |
| JP | 2020-079082 | 5/2020 |
| JP | 2020-163908 | 10/2020 |
| JP | 2020-164077 | 10/2020 |

OTHER PUBLICATIONS

Chinese Office Action for Chinese Patent Application No. 202080105164.4 mailed May 9, 2025.

* cited by examiner

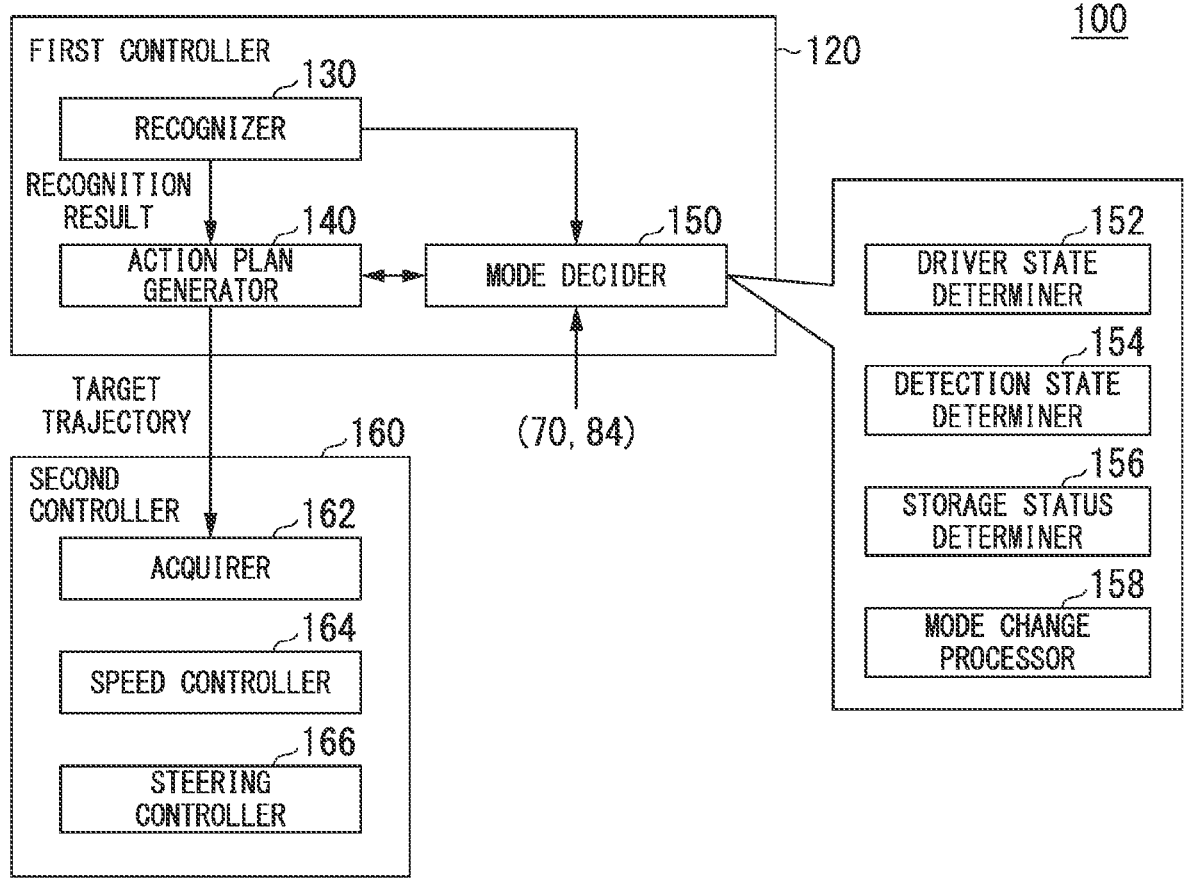

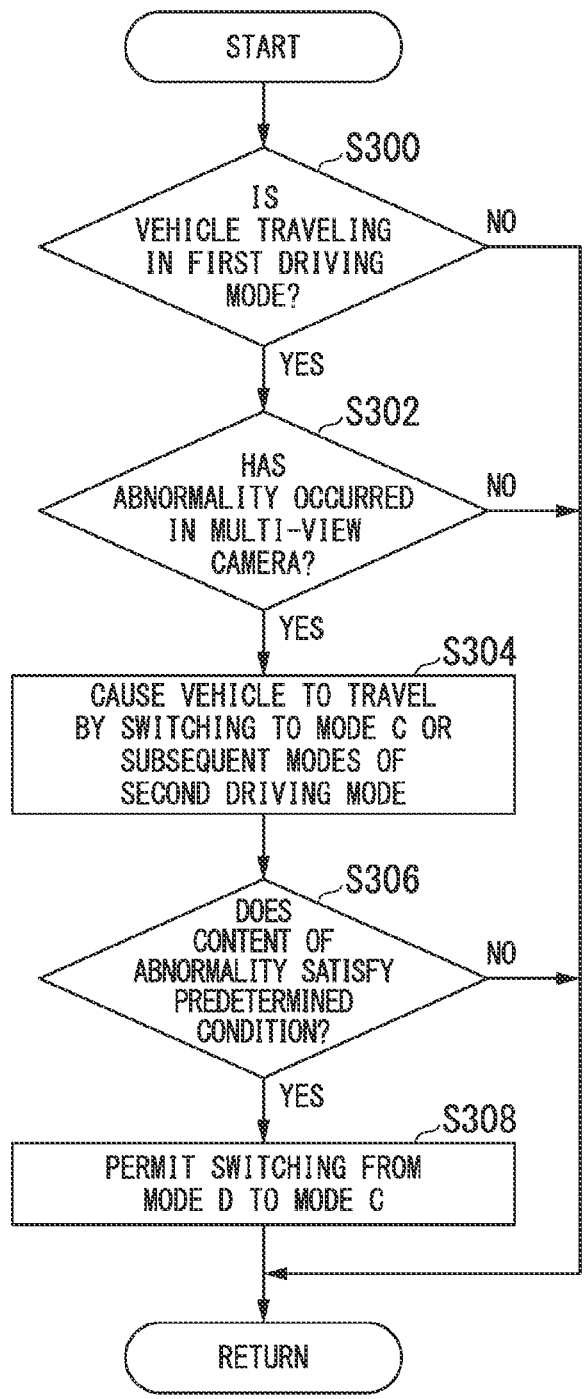

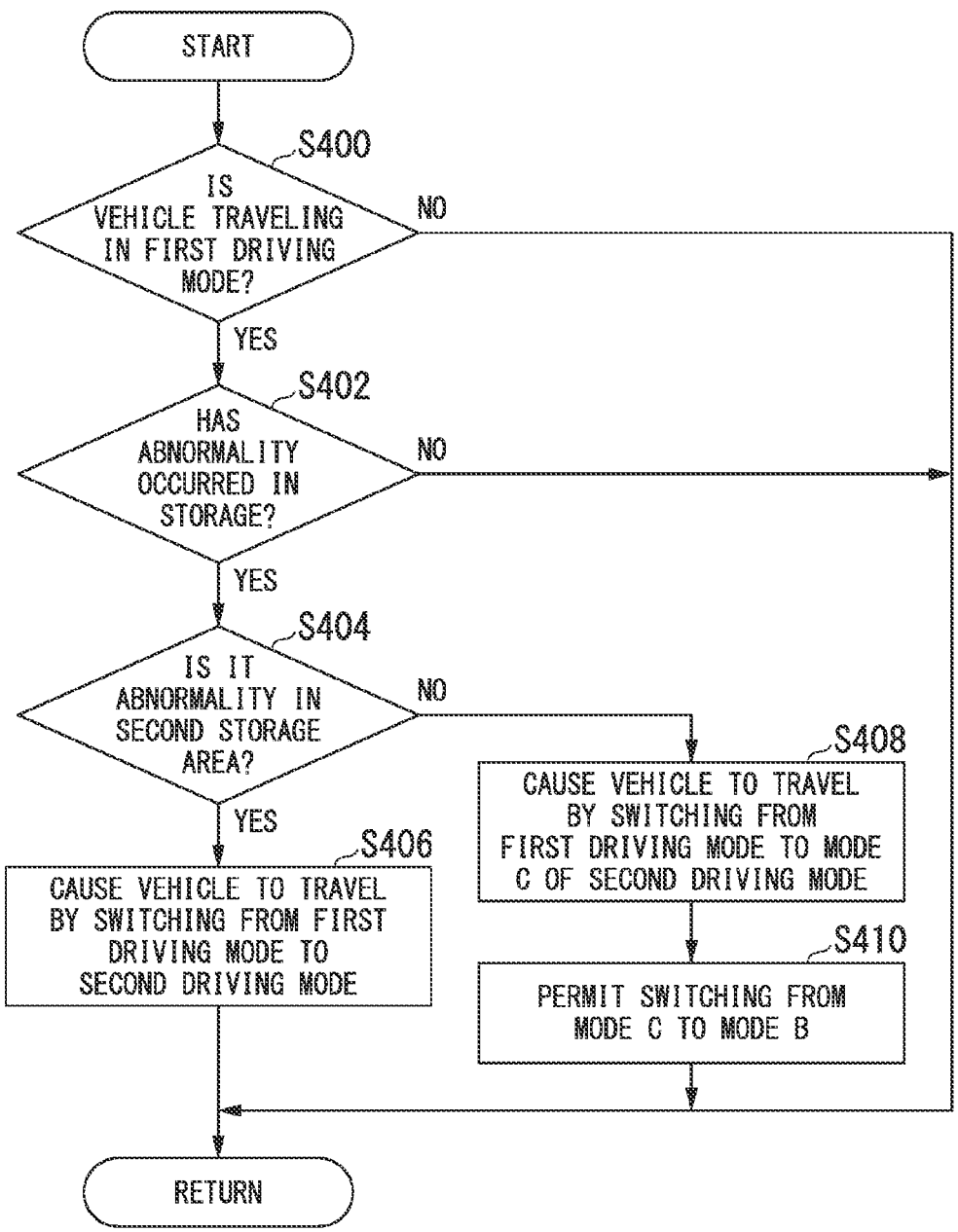

VEHICLE CONTROL DEVICE, VEHICLE CONTROL METHOD, AND PROGRAM

TECHNICAL FIELD

The present invention relates to a vehicle control device, a vehicle control method, and a program.

BACKGROUND ART

A technology related to a drive recorder that detects a surrounding status of a traveling vehicle and continuously stores a result of the detection in a recording medium is known (for example, refer to Patent Document 1).

CITATION LIST

Patent Document

[Patent Document 1]
Japanese Patent No. 6035032

SUMMARY OF INVENTION

Technical Problem

Incidentally, research on driving control, in which one or both of the steering and speed of a vehicle is automatically controlled to cause the vehicle to travel, has been conducted in recent years. However, a detection status of a surrounding status of the vehicle and driving control corresponding to a storage status of a result of the detection have not been considered. Therefore, there have been cases where appropriate driving control could not be performed.

The aspects of the present invention have been made in view of such circumstances, and an object thereof is to provide a vehicle control device, a vehicle control method, and a program capable of causing a vehicle to travel under more appropriate driving control.

Solution to Problem

The vehicle control device, the vehicle control method, and the program according to the present invention have adopted the following configuration.

(1): A vehicle control device according to one aspect of the present invention includes a recognizer configured to recognize a surrounding status of a vehicle, a driving controller configured to control one or both of steering and acceleration or deceleration of the vehicle on the basis of the surrounding status recognized by the recognizer or map information, a storage configured to store images of the surroundings of the vehicle captured by a peripheral camera mounted on the vehicle, and a storage controller configured to control the storage, in which the driving controller causes the vehicle to travel in one of a plurality of driving modes including a first driving mode and a second driving mode in which a task imposed on an occupant of the vehicle is greater than that in the first driving mode, and the driving controller causes the vehicle to travel by switching from the first driving mode to the second driving mode when an abnormality has occurred in one or both of the peripheral camera and the storage in the first driving mode, and continues the second driving mode when an abnormality has occurred in one or both of the peripheral camera and the storage in the second driving mode.

(2): In the aspect of (1) described above, the task imposed on the occupant in the second driving mode may include monitoring the surroundings of the vehicle or gripping an operator that receives a steering operation of the vehicle by the occupant.

(3): In the aspect of (1) or (2) described above, the task imposed on the occupant in the first driving mode may not include monitoring the surroundings of the vehicle or gripping an operator that receives a steering operation of the vehicle by the occupant.

(4): In the aspect of any one of (1) to (3) described above, the second driving mode includes a function of causing the vehicle to change lanes from a host lane in which the vehicle is traveling to an adjacent lane adjacent to the host lane, and the driving controller suppresses execution of the function of causing the vehicle to change lanes when an abnormality has occurred in the peripheral camera or the storage, and allows the execution of the function of causing the vehicle to change lanes when there is no abnormality in the peripheral camera and the storage.

(5): In the aspect of (4) described above, the function of causing the vehicle to change lanes includes a first lane change in which the driving controller plans a lane change of the vehicle and decides a start of the lane change of the vehicle to cause the vehicle to change lanes, a second lane change in which the driving controller plans a lane change of the vehicle and the occupant instructs the lane change of the vehicle to cause the vehicle to change lanes, and a third lane change in which the occupant plans a lane change of the vehicle and instructs a start of the lane change to cause the vehicle to change lanes, and the driving controller suppresses execution of one or both of the first lane change and the second lane change when an abnormality has occurred in the peripheral camera or the storage.

(6): In the aspect of any one of (1) to (5) described above, the second driving mode includes a plurality of modes with different tasks imposed on the occupant, and the driving controller allows the vehicle to travel by switching to a driving mode with a small task imposed on the occupant in the first driving mode or the second driving mode after the first driving mode is switched to the second driving mode when a predetermined abnormality has occurred in the peripheral camera.

(7): In the aspect of any one of (1) to (6) described above, the storage includes a first storage area in which overwriting storage of information including an image captured by the peripheral camera is permitted, and a second storage area in which overwriting storage of the information is not permitted, and the driving controller allows the vehicle to travel by switching the first driving mode to the second driving mode when an abnormality has occurred in the second storage area in the first driving mode.

(89): In the aspect of (7) described above, the second driving mode includes a plurality of modes with different degrees of automation, and the driving controller allows the vehicle to travel by switching to a driving mode with a small task imposed on the occupant in the second driving mode after the first driving mode is switched to the second driving mode when an abnormality has occurred in the first storage area in the first driving mode.

(9): In the aspect of (6) or (8) described above, the driving mode with a small task imposed on the occupant includes a mode that does not require gripping of an operator that receives a steering operation by the occupant.

(10): In the aspect of any one of (1) to (9) described above, the second driving mode includes a plurality of modes with different tasks imposed on the occupant, and the driving controller causes the vehicle to travel in a mode in which the task imposed on the occupant is equal to or greater than a threshold value when an abnormality has occurred in the peripheral camera and the storage.

(11): In the aspect of any one of (1) to (10) described above, the driving controller does not execute the first driving mode and the second driving mode when an abnormality has occurred in one or both of the peripheral camera and the storage before the first driving mode and the second driving mode are executed.

(12): A vehicle control method according to another aspect of the present invention includes, by a computer, recognizing a surrounding status of a vehicle, controlling one or both of steering and acceleration or deceleration of the vehicle on the basis of the recognized surrounding status or map information, causing a storage to store images of the surroundings of the vehicle captured by a peripheral camera mounted on the vehicle, causing the vehicle to travel in any one of a plurality of driving modes including a first driving mode and a second driving mode in which a task imposed on an occupant of the vehicle is greater than that in the first driving mode, causing the vehicle to travel by switching the first driving mode to the second driving mode when an abnormality has occurred in one or both of the peripheral camera and the storage in the first driving mode, and continuing the second driving mode when an abnormality has occurred in one or both of the peripheral camera and the storage in the second driving mode.

(13): A program according to still another aspect of the present invention causes a computer to execute recognizing a surrounding status of a vehicle, controlling one or both of steering and acceleration or deceleration of the vehicle on the basis of the recognized surrounding status or map information, causing a storage to store images of the surroundings of the vehicle captured by a peripheral camera mounted on the vehicle, causing the vehicle to travel in any one of a plurality of driving modes including a first driving mode and a second driving mode in which a task imposed on an occupant of the vehicle is greater than that in the first driving mode, causing the vehicle to travel by switching the first driving mode to the second driving mode when an abnormality has occurred in one or both of the peripheral camera and the storage in the first driving mode, and continuing the second driving mode when an abnormality has occurred in one or both of the peripheral camera and the storage in the second driving mode.

Advantageous Effects of Invention

According to (1) to (13), it is possible to cause a vehicle to travel under more appropriate driving control.

BRIEF DESCRIPTION OF DRAWINGS

FIG. 2 is a functional configuration diagram of a first controller 120 and a second controller 160.

FIG. 3 is a diagram which shows an example of relationship between a driving mode, a control state of a vehicle M, and a task.

FIG. 6 is a flowchart which shows an example of processing in a third decision pattern.

FIG. 7 is a flowchart which shows an example of processing in a fourth decision pattern.

DESCRIPTION OF EMBODIMENTS

Hereinafter, embodiments of a vehicle control device, a vehicle control method, and a program of the present invention will be described with reference to the drawings.

[Overall Configuration]

Figure 1:
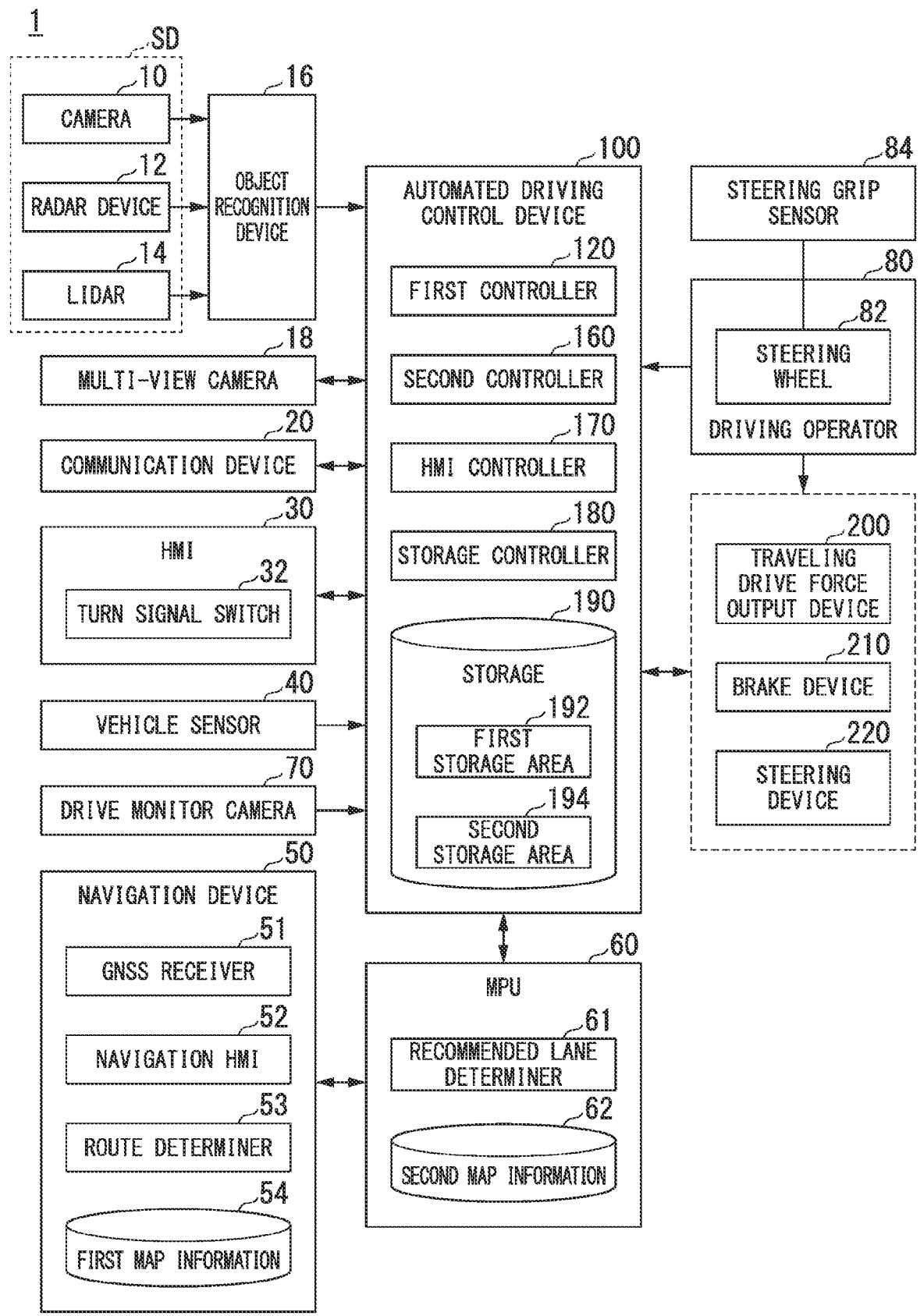
FIG. 1 is a configuration diagram of a vehicle system 1 using a vehicle control device according to an embodiment.

FIG. 1 is a configuration diagram of a vehicle system 1 using a vehicle control device according to an embodiment. A vehicle in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination of these. The electric motor operates by using electric power generated by a generator connected to the internal combustion engine or discharge power of secondary batteries or fuel cells.

The vehicle system 1 includes, for example, a camera 10, a radar device 12, a light detection and ranging (LIDAR) 14, an object recognition device 16, a multi-view camera 18, a communication device 20, a human machine interface (HMI) 30, and a vehicle sensor 40, a navigation device 50, a map positioning unit (MPU) 60, a drive monitor camera 70, a driving operator 80, an automated driving control device 100, a traveling drive force output device 200, a brake device 210, and a steering device 220.

These devices and apparatuses are connected to each other by a multiplex communication line such as a controller area network (CAN) communication line, a serial communication line, a wireless communication network, or the like. The configuration shown in FIG. 1 is merely an example, and a part of the configuration may be omitted or another configuration may be added. In addition, a combination of the camera 10, the radar device 12, and the LIDAR 14 is an example of a "surrounding status detector SD." The surrounding status detector SD may include other detectors that recognize a surrounding status of a vehicle, and may also include the object recognition device 16. The surrounding status detector SD and the automated driving control device 100 are examples of the "vehicle control device."

The camera 10 is a digital camera that uses a solid-state image sensor such as a charge coupled device (CCD) or a complementary metal oxide semiconductor (CMOS). The camera 10 is attached to an arbitrary place in a vehicle in which the vehicle system 1 is mounted (hereinafter, referred to as a vehicle M). When an image of the front is captured, the camera 10 is attached to an upper part of the front windshield, a back surface of the windshield rear-view mirror, and the like. The camera 10 periodically and repeatedly captures, for example, surroundings of the vehicle M. The camera 10 may be a stereo camera. The camera 10 is an example of an "object recognition camera."

The multi-view camera 18 is, for example, one or more cameras that capture images of the surroundings of the vehicle M (including still images and moving images). For example, the multi-view cameras 18 are attached to four corners of the vehicle M, and a scenery in the surroundings of the vehicle M is captured by each camera. The multi-view camera 18 may operate, for example, when the vehicle M is parked, may operate when a surrounding status of the vehicle M is a predetermined status, or may operate when the vehicle M exhibits a predetermined behavior. The predetermined status is, for example, an approach of an obstacle such as another vehicle. In addition, the multi-view camera 18 captures an image for a predetermined time after being operated. Moreover, the multi-view camera 18 may repeatedly capture images periodically. The multi-view camera 18 is an example of a "peripheral camera." The images captured by the multi-view camera 18 are not used for, for example, control of steering or acceleration or deceleration of the vehicle M (not used for automated driving control).

The radar device 12 radiates radio waves such as millimeter waves to the surroundings of the vehicle M, and also detects at least a position (a distance and an orientation) of an object by detecting radio waves (reflected waves) reflected by the object. The radar device 12 is attached to an arbitrary place on the vehicle M. The radar device 12 may detect the position and speed of an object in a frequency modulated continuous wave (FM-CW) method.

The LIDAR 14 irradiates the surroundings of the vehicle M with light (or electromagnetic waves with wavelengths close to that of light) and measures scattered light. The LIDAR 14 detects a distance to a target based on a time from light emission to light reception. The irradiated light is, for example, a pulsed laser beam. The LIDAR 14 is attached to an arbitrary place on the vehicle M.

The object recognition device 16 performs sensor fusion processing on a result of detection by a part or all of the camera 10, the radar device 12, and the LIDAR 14, and recognizes the position, type, speed, and the like of an object. The object recognition device 16 outputs a result of recognition to the automated driving control device 100. The object recognition device 16 may output the results of detection by the camera 10, the radar device 12, and the LIDAR 14 to the automated driving control device 100 as they are. The object recognition device 16 may be omitted from the vehicle system 1.

The communication device 20 communicates with other vehicles present in the surroundings of the vehicle M by using, for example, a cellular network, a Wi-Fi network, Bluetooth (a registered trademark), dedicated short range communication (DSRC), or the like, or communicates with various server devices via a wireless base station.

The HMI 30 presents various types of information to an occupant of the vehicle M and receives an input operation by the occupant under control of the HMI controller 170. The HMI 30 includes, for example, various display devices, a speaker, a microphone, a buzzer, a touch panel, a switch, a key, and the like. The switch includes, for example, a turn signal switch (direction indicator) 32. The turn signal switch 32 is provided, for example, on a steering column or a steering wheel. The turn signal switch 32 is, for example, an example of an operator that receives an instruction for a lane change of the vehicle M from the occupant.

The vehicle sensor 40 includes a vehicle speed sensor that detects a speed of the vehicle M, an acceleration sensor that detects acceleration, a yaw rate sensor that detects an angular speed around a vertical axis, an azimuth sensor that detects a direction of the vehicle M, and the like.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 identifies the position of the vehicle M based on a signal received from a GNSS satellite. The position of the vehicle M may be identified or complemented by an inertial navigation system (INS) using an output of the vehicle sensor 40. The navigation HMI 52 includes a display device, a speaker, a touch panel, a key, and the like. The navigation HMI 52 may be partially or entirely shared with the HMI 30 described above. The route determiner 53 determines, for example, a route from the position of the vehicle M (or an arbitrary position to be input) identified by the GNSS receiver 51 to a destination to be input by the occupant using the navigation HMI 52 (hereinafter, a route on a map) with reference to the first map information 54. The first map information 54 is, for example, information in which a road shape is expressed by a link indicating a road and nodes connected by a link. The first map information 54 may include a road curvature, point of interest (POI) information, and the like. A route on a map is output to the MPU 60. The navigation device 50 may perform route guidance using the navigation HMI 52 based on the route on a map. The navigation device 50 may be realized by, for example, a function of a terminal device such as a smartphone or a tablet terminal owned by the occupant. The navigation device 50 may transmit a current position and a destination to a navigation server via the communication device 20 and acquire a route equivalent to the route on a map from the navigation server.

The MPU 60 includes, for example, a recommended lane determiner 61, and holds second map information 62 in a storage device such as an HDD or a flash memory. The recommended lane determiner 61 divides the route on a map provided from the navigation device 50 into a plurality of blocks (for example, divides every 100 [m] in a vehicle traveling direction), and determines a recommended lane for each block with reference to the second map information 62. The recommended lane determiner 61 determines which numbered lane from the left to drive. When a branch place is present on the route on a map, the recommended lane determiner 61 determines a recommended lane so that the vehicle M can travel on a reasonable route to proceed to the branch destination.

The second map information 62 is map information with higher accuracy than the first map information 54. The second map information 62 includes, for example, information on a center of a lane, information on a boundary of the lane, and the like. In addition, the second map information 62 may include road information, traffic regulation information, address information (addresses/zip codes), facility information, telephone number information, and the like. The second map information 62 may be updated at any time by the communication device 20 communicating with another device.

The drive monitor camera 70 is, for example, a digital camera using a solid-state imaging device such as CCD or CMOS. For example, the drive monitor camera 70 is attached at any place on the vehicle M, which is a position and a direction at which the head of an occupant (hereafter referred to as a driver) seated in a driver's seat of the vehicle M can be imaged from the front (in a direction for imaging the face). For example, the drive monitor camera 70 is attached to an upper portion of a display device provided in a center portion of an instrument panel of the vehicle M.

The driving operator 80 includes, for example, in addition to the steering wheel 82, an accelerator pedal, a brake pedal, a shift lever, and other operators. The driving operator 80 has a sensor that detects the amount of operation or a presence or absence of an operation attached thereto, and a result of detection is output to the automated driving control device 100, or some or all of the traveling drive force output device 200, the brake device 210, and the steering device 220. The steering wheel 82 is an example of an "operator that receives a steering operation from a driver." The operator does not necessarily have to be circular, and may be in a form of a deformed steering wheel, a joystick, a button, or the like. A steering grip sensor 84 is attached to the steering wheel 82. The steering grip sensor 84 is realized by an electrostatic capacitance sensor or the like, and outputs a signal capable of detecting whether the driver is gripping the steering wheel 82 (being in a contact in a state where force is applied) to the automated driving control device 100.

The automated driving control device 100 includes, for example, a first controller 120, a second controller 160, a HMI controller 170, a storage controller 180, and a storage 190. The first controller 120, the second controller 160, the HMI controller 170, and the storage controller 180 are realized by, for example, a hardware processor such as a central processing unit (CPU) executing a program (software), respectively. In addition, some or all of these components may be realized by hardware (a circuit unit; including circuitry) such as large scale integration (LSI), an application specific integrated circuit (ASIC), a field-programmable gate array (FPGA), or a graphics processing unit (GPU), or may be realized by software and hardware in cooperation. A program may be stored in advance in a storage device (a storage device having a non-transitory storage medium) such as an HDD or flash memory of the automated driving control device 100, or may be stored in a detachable storage medium such as a DVD or a CD-ROM and installed in the HDD or flash memory of the automated driving control device 100 by the storage medium (non-transitory storage medium) being attached to a drive device. A combination of the action plan generator 140 and the second controller 160 is an example of a "driving controller." The driving controller controls, for example, one or both of steering and acceleration or deceleration of the vehicle M on the basis of the surrounding status or map information recognized by the recognizer 130. The storage controller 180 and the storage 190 may function as, for example, a drive recorder that stores information on a traveling status of the vehicle M (for example, information including images captured by the multi-view camera 18 (for example, data log information to be described below)).

The storage 190 may be realized by various storage devices described above, a solid state drive (SSD), an electrically erasable programmable read only memory (EE-PROM), a read only memory (ROM), a random access memory (RAM), or the like. The storage 190 includes, for example, a first storage area 192 and a second storage area. The first storage area 192 is, for example, a storage area in which it is permitted to overwrite data already stored in the area with new data to store it (hereinafter referred to as "overwriting storage of data"). The second storage area 194 is a storage area in which the overwriting storage of data is not permitted. The second storage area 194 may be, for example, an area in which data deletion or overwriting by a specific authority (for example, a dealer manager or administrator) is permitted.

The storage 190 stores, for example, images of the surroundings of the vehicle M captured by the multi-view camera 18, information indicating a driving status of the vehicle M, information necessary for executing driving control in the present embodiment, various other types of information, programs, and the like. The information indicating a driving status of the vehicle M is, for example, an image captured by the multi-view camera 18. In addition, the information indicating a driving status of the vehicle M may include a detection result from the vehicle sensor 40 and information detected by the drive monitor camera 70.

The storage controller 180 controls the storage 190. For example, the storage controller 180 controls content to be stored and a timing to be stored in the first storage area 192 and the second storage area 194 included in the storage 190. In addition, the storage controller 180 may manage an address space in the first storage area 192 or the second storage area 194, and control whether to permit the overwriting storage of data.

For example, the storage controller 180 causes the storage 190 to store information including images captured by the multi-view camera 18 together with time information, information detected by the vehicle sensor 40, and the like as data log information. In addition, when an abnormal behavior (event) such as sudden acceleration or deceleration or sudden steering of the vehicle M or its contact with an object is detected, the storage controller 180 causes the storage 190 to store a video of a predetermined time (for example, about 15 to 30 seconds) before and after the abnormal behavior, captured by the multi-view camera 18, in association with information detected by the vehicle sensor 40 before and after the abnormal behavior is detected, date and time information, position information of the vehicle M, and the like as data log information. Here, the storage controller 180 stores the data log information in the second storage area 194 when the data log information is stored according to the detection of the abnormal behavior of the vehicle M, and stores the data log information in the first storage area 192 when the abnormal behavior of the vehicle M is not detected and the data log information is stored at predetermined intervals. The data log information stored in the storage 190 is used for, for example, a traveling analysis of the vehicle M, an analysis of a cause when the vehicle M comes into contact with objects such as other vehicles or obstacles (for example, walls, curbs, pedestrians).

FIG. 2 is a functional configuration diagram of the first controller 120 and the second controller 160. The first controller 120 includes, for example, the recognizer 130, the action plan generator 140, and a mode decider 150. The first controller 120 realizes, for example, a function by artificial intelligence (AI) and a function of a predetermined model in parallel. For example, a function of "recognizing an intersection" may be realized by executing both recognition of an intersection by deep learning and recognition based on a predetermined condition (a signal for pattern matching, a road sign, or the like) in parallel, and scoring and comprehensively evaluating the both. As a result, reliability of automated driving is ensured.

The recognizer 130 recognizes the surrounding status of the vehicle M on the basis of information input from the camera 10, the radar device 12, and the LIDAR 14 via the object recognition device 16. For example, the recognizer 130 recognizes the position of an object in the surroundings of the vehicle M and states such as a speed and acceleration thereof. The position of an object is recognized as, for example, a position on absolute coordinates with a representative point (a center of gravity, a center of a drive axis, or the like) of the vehicle M as an origin, and is used for control. The position of an object may be represented by a representative point such as the center of gravity or a corner of the object, or may be represented by an area. The "states" of an object may include the acceleration or jerk of the object, or a "behavioral state" (for example, whether a lane is being changed or is about to be changed).

In addition, the recognizer 130 recognizes, for example, a lane (a traveling lane) in which the vehicle M is traveling. For example, the recognizer 130 recognizes a traveling lane by comparing a pattern of road lane marking (for example, an array of solid lines and broken lines) obtained from the second map information 62 with a pattern of road lane marking in the surroundings of the vehicle M recognized from an image captured by the camera 10. The recognizer 130 may also recognize a traveling lane by recognizing not only the road lane marking but also road boundaries including the road lane marking, a road shoulder, a curb, a median strip, a guardrail, and the like. In this recognition, the position of the vehicle M acquired from the navigation device 50 and a result of processing by the INS may be taken into account. In addition, the recognizer 130 recognizes stop lines, obstacles, red lights, tollhouses, and other road events.

The recognizer 130 recognizes the position and posture of the vehicle M with respect to a traveling lane when a traveling lane is recognized. The recognizer 130 recognizes, for example, a deviation of a reference point of the vehicle M from a center of the lane and an angle of the vehicle M, formed with respect to a line connecting the centers of the lane in the traveling direction, as a relative position and the posture of the vehicle M with respect to the traveling lane. Instead, the recognizer 130 may recognize the position or the like of the reference point of the vehicle M with respect to any side end (a road lane marking or road boundary) of the traveling lane as the relative position of the vehicle M with respect to the traveling lane.

In principle, the action plan generator 140 travels in a recommended lane determined by the recommended lane determiner 61, and, furthermore, generates a target trajectory on which the vehicle M will automatically travel (regardless of an operation of a driver) in the future so as to be able to respond to the surrounding status of the vehicle M. The target trajectory includes, for example, a speed element. For example, the target trajectory is expressed as a sequence of points (trajectory points) to be reached by the vehicle M. The trajectory point is a point to be reached by the vehicle M for each predetermined traveling distance (for example, about several [m]) along a road, and, separately, a target speed and a target acceleration for each predetermined sampling time (for example, about decimal point number [sec]) are generated as a part of the target trajectory. In addition, the trajectory point may be a position to be reached by the vehicle M at a corresponding sampling time for each predetermined sampling time. In this case, information on the target speed and target acceleration is expressed by an interval between trajectory points.

The action plan generator 140 may set an event (function) of automated driving when a target trajectory is generated. The event of automated driving includes a constant-speed traveling event, a low-speed following traveling event, a lane change event, a branching event, a merging event, and a takeover event. The action plan generator 140 generates a target trajectory according to an event to be started.

The mode decider 150 decides a driving mode of the vehicle M between a plurality of driving modes with different tasks imposed on the driver (in other words, a plurality of modes with different degrees of automation). The driving controller causes the vehicle M to travel in a mode decided by the mode decider 150. The mode decider 150 includes, for example, a driver state determiner 152, a detection state determiner 154, a storage status determiner 156, and a mode change processor 158. These individual functions are will be described below.

FIG. 3 is a diagram which shows an example of a relationship among a driving mode, a control state of the vehicle M, and a task. The driving mode of the vehicle M includes, for example, five modes, from a mode A to a mode E. The mode A is an example of a "first driving mode." The modes B, C and D are examples of a "second driving mode." The modes A to D are examples of an "automated driving mode." In the mode A to the mode E, the control state, that is, a degree of automation of the driving control of the vehicle M is the highest in the mode A, is decreased in order of the mode B, the mode C, and the mode D, and is the lowest in the mode E. On the other hand, the task imposed on the driver (occupant) is the lightest in the mode A, is then increased in the order of the mode B, the mode C, and the mode D, and is the heaviest in the mode E in which manual driving is performed. Since the control state is not automated driving in the modes B to E, a responsibility of the automated driving control device 100 is to end control related to automated driving and to shift to driving assistance or manual driving. Content of each mode will be exemplified below.

In the mode A, the state is automated driving, and the driver is not tasked either with monitoring the surroundings of the vehicle M or with gripping the steering wheel 82 (hereinafter referred to as "steering gripping"). Surroundings monitoring includes at least monitoring a front of the vehicle M (forward monitoring in FIG. 3). Front means a space in the traveling direction of the vehicle M visually recognized through the front windshield. However, even in the mode A, the driver is required to be in a posture of being able to shift to manual driving quickly in response to a request from the system focusing on the automated driving control device 100. A term "automated driving" herein means that both the steering and the acceleration or deceleration of the vehicle M are controlled independently of an operation of the driver. The mode A is, for example, a driving mode that can be executed when a condition is satisfied, such as that the vehicle M is traveling at a predetermined speed (for example, about 50 [km/h]) or less on a road dedicated to automobiles such as a high-speed road and there is a preceding vehicle to be followed, and it may also be referred to as a congestion follow-up mode (or Traffic Jam Pilot (TJP) mode). The mode decider 150 changes the driving mode of the vehicle M to the mode B when this condition is no longer satisfied.

Also, during the execution of the mode A, the occupant can execute a second task. A second task is, for example, an action other than the driving of an occupant allowed during automated driving of the vehicle M. The second task includes, for example, watching TV, talking on a mobile phone, sending and receiving e-mails, eating meals, and the like.

In the mode B, the state is driving assistance, and the driver is tasked with monitoring the front of the vehicle M (hereinafter referred to as forward monitoring), but is not tasked with gripping the steering wheels 82. For example, in the mode B, the lane change of the vehicle M is performed based on a route setting to a destination or the like performed by the navigation device 50 according to determination by the vehicle system 1 side without receiving a lane change instruction from the occupant. A lane change means causing the vehicle M to move from a host lane in which the vehicle M is traveling to an adjacent lane adjacent to the host lane, and may include a lane change based on branching or merging. Lane change control in the mode B is, for example, control in which the driving controller plans the lane change of the vehicle M and decides a start of the lane change of the vehicle M to cause the vehicle M to change lanes, and is an example of a first lane change. The vehicle system 1 is a driving subject in the modes A and B.

In the mode C, the state is driving assistance, and the driver is tasked with forward monitoring and gripping the steering wheel 82. For example, in the mode C, when the vehicle system 1 side determines that a lane change of the vehicle M is necessary, an inquiry is made to the occupant via the HMI 30, and driving assistance of executing a lane change is performed when an approval of the lane change by the occupant is received from the HMI 30 or the like. The lane change control in the mode C is, for example, control in which the driving controller plans a lane change of the vehicle M and the occupant instructs the lane change of the vehicle M to cause the vehicle M to change lanes, and is an example of a "second lane change." The first and second lane changes are lane changes by a system subject.

The mode D is a driving mode in which a certain amount of driving operation by the driver is required for at least one of steering and acceleration or deceleration of the vehicle M. For example, in the mode D, driving assistance such as adaptive cruise control (ACC) and a lane keeping assist system (LKAS) is performed. In addition, in the mode D, when an instruction to cause the vehicle M to change lanes according to an operation of the turn signal switch 32 by the driver is received, driving assistance of executing a lane change in an instructed direction is performed. The lane change control in the mode D is, for example, control in which the occupant plans a lane change of the vehicle M and instructs a start of the lane change to cause the vehicle M to change lanes, and is an example of a "third lane change." The second lane change is a lane change according to an intention of the driver. The second lane change may be executed in the mode C. The driver's operation of the turn signal switch 32 is an example of a driving operation. In addition, a driving operation in the mode D may include a driving operation for controlling steering or acceleration or deceleration thereof. The first lane change and the second lane change described above are examples of a lane change event.

In the mode E, both the steering and acceleration or deceleration of the vehicle M are in a manual driving state in which a driving operation of the driver is required. In both the mode D and the mode E, the task of monitoring the front of the vehicle M is naturally imposed on the driver. A driving subject in the modes C to E is the driver.

The mode decider 150 changes the driving mode of the vehicle M to a driving mode with a heavier task when a task related to the determined driving mode is not executed by the driver.

For example, during the execution of the mode A, when the driver is in a posture of not being able to shift to manual driving in response to a request from the system (for example, when the driver continues to look aside outside an allowable area, or when a sign indicating a difficulty in driving is detected), the mode decider 150 causes the HMI controller 170 to execute control for prompting the driver to shift to manual driving in the mode E by using the HMI 30. In addition, when the driver does not respond even after a predetermined time has passed since the HMI controller 170 is caused to execute the control for prompting the shift to manual driving, or when it is estimated that the driver is not in a state for performing the manual driving, the mode decider 150 performs control such that the vehicle M is gradually decelerated while approaching a target position (for example, a shoulder of a road), and automated driving is stopped. In addition, after the automated driving is stopped, the vehicle M is in a state of the mode D or E, and the vehicle M can be started by a manual operation of the driver. In the following description, the same applies to "stop automated driving."

When the driver is not monitoring the front in the mode B, the mode decider 150 urges the driver to monitor the front by using the HMI 30, and performs control such that the vehicle M is brought closer to the target position and gradually stopped, and the automated driving is stopped if the driver does not respond. When the driver does not monitor the front or does not grip the steering wheel 82 in the mode C, the mode decider 150 urges the driver to monitor the front and/or to grip the steering wheels 82 by using the HMI 30, and performs control such that the vehicle M is brought closer to the target position and gradually stopped, and the automated driving is stopped if the driver does not respond.

The driver state determiner 152 determines whether the occupant (driver) is in a state suitable for driving. For example, the driver state determiner 152 monitors the driver's state for the mode change described above, and determines whether the driver's state is a state corresponding to a task. For example, the driver state determiner 152 analyzes an image captured by the drive monitor camera 70 to perform posture estimation processing, and determines whether the driver is in a posture of not being able to shift to manual driving in response to a request from the system. In addition, the driver state determiner 152 analyzes the image captured by the drive monitor camera 70 to perform line-of-sight estimation processing, and determines whether the driver is monitoring the periphery (more specifically, the front) of the vehicle M. When the driver state determiner 152 determines that the driver's state is not a state corresponding to a task for a predetermined time or longer, the driver state determiner 152 determines that the driver is in a state that is not suitable for driving of the task. In addition, when it is determined that the driver's state is a state corresponding to a task, the driver state determiner 152 determines that the driver is in a state suitable for driving of the task. Moreover, the driver state determiner 152 may determine whether the occupant is in a state in which a driver change is possible.

The detection state determiner 154 determines whether an abnormality has occurred in the multi-view camera 18 on the basis of a result of imaging processing by the multi-view camera 18. For example, when a captured image cannot be acquired from the multi-view camera 18 for a predetermined time or longer, when an image detection result is an abnormal value, when an image detection accuracy or detection performance has degraded (weakened) below a threshold value, when error information is output from the multi-view camera 18, the detection state determiner 154 determines that an abnormality occurs in the multi-view camera 18. The degradation in the image detection accuracy and detection performance includes, for example, a degradation in an image quality lower than a reference value, existence of a predetermined amount or more of noise in an image, an imaging range of an image being narrowed, an imaging distance being shortened, an imaging cycle being slowed, and the like. In addition, the detection state determiner 154 may also determine that an abnormality has occurred in the multi-view camera 18 when it performs error control such as error detection and error correction for data that is a result of imaging from the multi-view camera 18, and the error control is not completed normally (for example, an abnormality of the data is not resolved). For error control, for example, a parity check method, a checksum method, a cyclic redundancy check (CRC) method, and a hamming code method are used. In addition, it may be determined in which camera among one or more cameras included in the multi-view camera 18 an abnormality has occurred. Note that the detection state determiner 154 may determine whether an abnormality occurs in a surrounding status detector SD in addition to (or instead of) the abnormality of the multi-view camera 18.

The storage status determiner 156 determines whether an abnormality has occurred in a storage status of the storage 190. For example, if the storage status determiner 156 determines that an abnormality has occurred in the storage status of the storage 190 when data cannot be written to one or both of the first storage area 192 and the second storage area 194 under control of the storage controller 180. A non-writable status is, for example, when an error occurs at the time of performing processing of writing data log information or the like in a storage area. In addition, the non-writable status is, for example, when the amount of data to be written in the second storage area 194 is larger than a free space of the second storage area 194.

In addition, the storage status determiner 156 may check whether content stored in the storage 190 is normal, and determine whether an abnormality has occurred in the storage status of the storage 190 on the basis of a result of the checking. In this case, the storage status determiner 156 performs error control on each of the first storage area 192 and the second storage area 194 at a predetermined cycle or at a predetermined timing, and when the error control is not completed normally (for example, an abnormality in data is not resolved), it determines that an abnormality occurs in the data stored in the storage 190 (not normal). The storage status determiner 156 may identify a storage area in which an abnormality has occurred among the first storage area 192 and the second storage area 194. In addition, the storage status determiner 156 may determine, for example, that the storage 190 is abnormal when an abnormality has occurred in processing on the storage controller 180 side (for example, processing for storing data in the storage 190, error detection processing, and the like).

The mode decider 150 decides the driving mode of the vehicle M on the basis of results of determining each of the driver state determiner 152, the detection state determiner 154, and the storage status determiner 156.

The mode change processor 158 performs various types of processing for changing to the mode determined by the mode decider 150. For example, the mode change processor 158 instructs a driving assistance device (not shown) to operate, controls the HMI 30 to prompt the driver to take an action, or instructs to generate a target trajectory for an emergency stop based on the action plan generator 140.

The second controller 160 controls the traveling drive force output device 200, the brake device 210, and the steering device 220 so that the vehicle M passes through a target trajectory generated by the action plan generator 140 at a scheduled time.

The second controller 160 includes, for example, an acquirer 162, a speed controller 164, and a steering controller 166. The acquirer 162 acquires information on a target trajectory (trajectory points) generated by the action plan generator 140 and stores it in a memory (not shown). The speed controller 164 controls the traveling drive force output device 200 or the brake device 210 based on a speed element associated with the target trajectory stored in the memory. The steering controller 166 controls the steering device 220 according to a degree of bending of the target trajectory stored in the memory. Processing of the speed controller 164 and the steering controller 166 is realized by, for example, a combination of feedforward control and feedback control. As an example, the steering controller 166 executes feedforward control according to a curvature of a road in front of the vehicle M and feedback control based on a deviation from the target trajectory in combination.

The HMI controller 170 notifies the occupant of predetermined information through the HMI 30. The predetermined information includes, for example, information related to traveling of the vehicle M such as information regarding a state of the vehicle M and information regarding driving control. The information regarding a state of the vehicle M includes, for example, the speed, an engine speed, a shift position, and the like of the vehicle M. In addition, the information regarding driving control includes, for example, an inquiry as to whether to perform a lane change, whether driving control is executed, information regarding a change in driving control, information regarding a status of driving control (for example, content of an event being executed). In addition, the predetermined information may also include information that is not related to traveling control of the vehicle M, such as content (for example, movies) stored in a storage medium such as a TV program or DVD. Moreover, the predetermined information may include, for example, a current position or a destination of the vehicle M, and information regarding a remaining amount of fuel.

For example, the HMI controller 170 may generate an image containing the predetermined information described above, display the generated image on a display device of the HMI 30, generate a sound indicating the predetermined information, and cause a speaker of the HMI 30 to output the generated sound. In addition, the HMI controller 170 may output information received by the HMI 30 to the communication device 20, the navigation device 50, the first controller 120, and the like.

The traveling drive force output device 200 outputs a traveling drive force (torque) for the vehicle to travel to the drive wheels. The traveling drive force output device 200 includes, for example, a combination of an internal combustion engine, a motor, a transmission, and the like, and an electronic control unit (ECU) that controls these. The ECU controls the configuration described above according to information input from the second controller 160 or information input from the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor according to the information input from the second controller 160 or the information input from the driving operator 80 so that a brake torque according to a braking operation is output to each wheel. The brake device 210 may include a mechanism for transmitting a hydraulic pressure generated by an operation of a brake pedal included in the driving operator 80 to the cylinder via a master cylinder as a backup. The brake device 210 is not limited to the configuration described above, and may be an electronically controlled hydraulic brake device that controls an actuator according to the information input from the second controller 160 to transmit the hydraulic pressure of the master cylinder to the cylinder.

The steering device 220 includes, for example, a steering ECU and an electric motor. The electric motor changes, for example, a direction of a steering wheel by applying a force to a rack and pinion mechanism. The steering ECU drives the electric motor according to the information input from the second controller 160 or the information input from the driving operator 80, and changes the direction of the steering wheel.

[Decision of Mode of Vehicle M]

Decision of a mode of the vehicle M by the mode decider 150 will be specifically described hereinafter. In the following description, it is assumed that the driver is in a state in which the driver is determined to perform a task imposed according to a mode by the driver state determiner 152, and an example in which the mode of the vehicle M is decided will be described by dividing it into several decision patterns on the basis of determination results of each of the detection state determiner 154 and the storage status determiner 156. When the driver state determiner 152 determines that the driver is not executing a task imposed according to a mode, the mode decider 150 decides to change to a mode according to a task that the driver is executing.

<First Decision Pattern>

Figure 4:
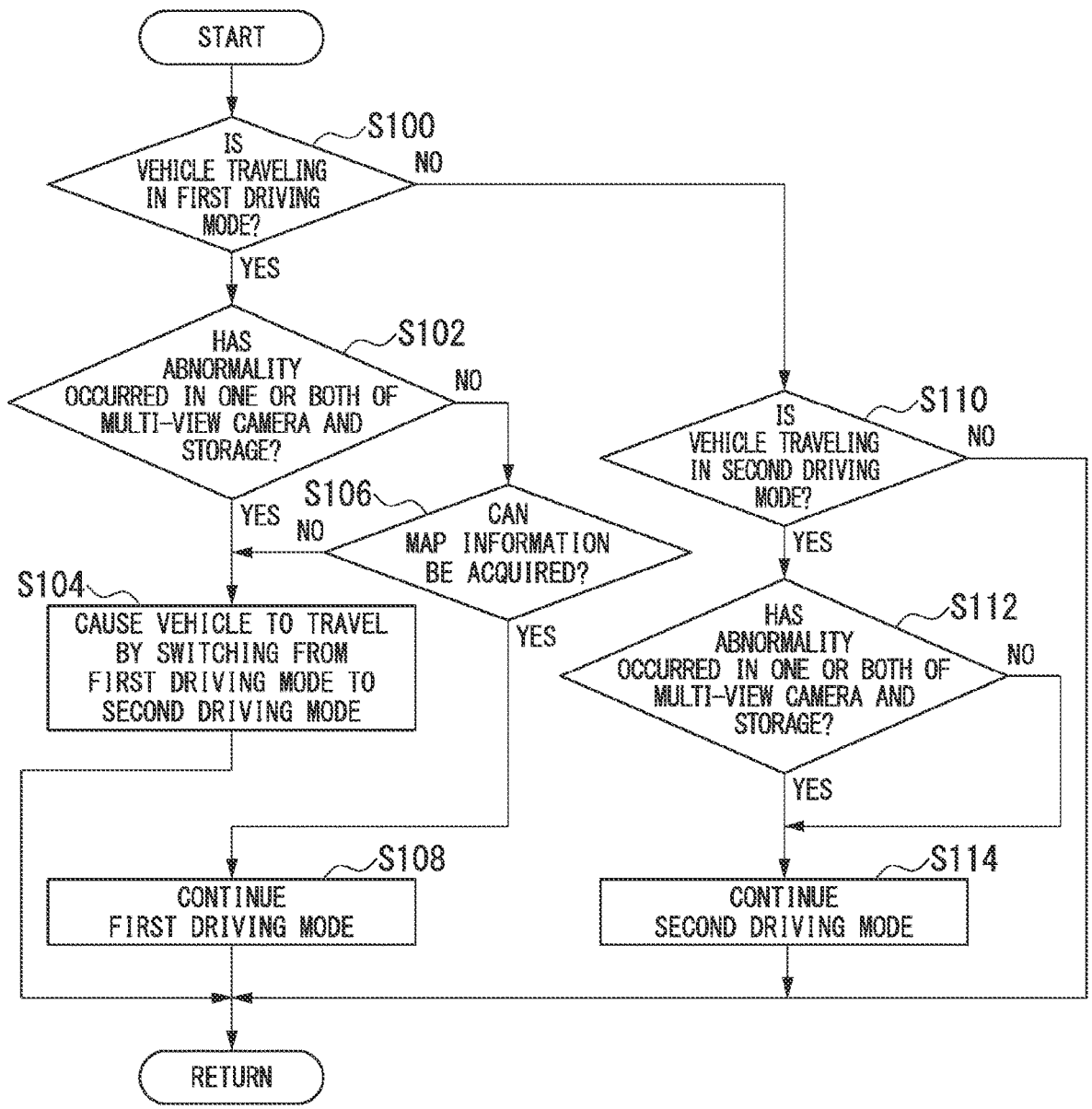
FIG. 4 is a flowchart which shows an example of processing in a first decision pattern.

FIG. 4 is a flowchart which shows an example of processing in a first decision pattern. The flowchart shown in FIG. 4 may be repeatedly executed at predetermined timings or in predetermined cycles. The same applies to description of other flowcharts to be described below. In the first decision pattern, the mode decider 150 determines whether the vehicle M is traveling in the first driving mode (the mode A) (step S100). When it is determined that the vehicle M is traveling in the first driving mode, the mode decider 150 determines whether an abnormality has occurred in one or both of the multi-view camera 18 and the storage 190 on the basis of results of determination by each of the detection state determiner 154 and the storage status determiner 156 (step S102). When it is determined that an abnormality has occurred in one or both of the multi-view camera 18 and the storage 190, the mode decider 150 decides to cause the vehicle to travel by switching the driving mode from the first driving mode to the second driving mode (step S104). In the first decision pattern, the second driving mode is, among the modes B to D, the mode C or the mode D in which the task imposed on the driver includes monitoring the surroundings of the vehicle M (specifically, forward monitoring) and steering gripping.

In addition, in the processing of step S102, when it is determined that there is no abnormality in one or both of surrounding status detection and storage, the mode decider 150 determines whether the map information can be acquired (step S106). In addition, in the processing of step S106, it may be determined whether the map information has no abnormalities or the like and can be acquired normally (safely). When it is determined that the map information cannot be acquired, the processing of step S104 is performed. In addition, when it is determined that the map information can be acquired, the mode decider 150 decides to continue the first driving mode (step S108). Note that the processing of step S108 may also be omitted.

Moreover, when it is determined in the processing of step S100 that the vehicle M is not traveling in the first driving mode, the mode decider 150 determines whether the vehicle M is traveling in the second driving mode (step S110). When it is determined that the vehicle is traveling in the second driving mode, the mode decider 150 determines whether an abnormality has occurred in one or both of the multi-view camera 18 and the storage 190 on the basis of results of determination by each of the detection state determiner 154 and the storage status determiner 156 (step S112). When it is determined that an abnormality has occurred in one or both of the multi-view camera 18 and the storage 190, the mode decider 150 decides to continue the second driving mode which is being executed (step S114). In addition, when it is determined in the processing of step S112 that there is no abnormality in one or both of the multi-view camera 18 and the storage 190, the mode decider 150 decides to continue the second driving mode. That is, in the first decision pattern, when the vehicle M is traveling in the second driving mode (the mode C or the mode D), the second driving mode continues regardless of whether an abnormality occurs in one or both of the multi-view camera 18 and the storage 190. Therefore, in the processing of FIG. 4, the processing of steps S112 and S114 may be omitted. This completes the processing of this flowchart. In addition, when it is determined in the processing of step S110 that the vehicle M is not traveling in the second driving mode, the processing of this flowchart is completed without any change because the manual driving in the mode E is executed.

The data log information stored in the storage 190 is used for, for example, a cause analysis when the vehicle M comes into contact with an object such as another vehicle or an obstacle. In addition, this analysis includes a subject analysis of whether the driving subject at the time of contact is the vehicle system 1 side or the driver side. Therefore, like the first decision pattern, when an abnormality has occurred in the multi-view camera 18 that acquires data log information and the storage 190 that stores the data log information in the first driving mode (for example, the mode A) in which the vehicle system 1 is the driving subject, the subject analysis and the like described above cannot be performed. Therefore, the first driving mode in which the vehicle system 1 is the driving subject is suppressed, and is switched to the second driving mode (mode) in which the driver is the driving subject. As a result, it is possible to cause the vehicle M to travel under more appropriate driving control. In addition, even if the data log information is not stored in the storage 190 when the vehicle M comes into contact with an object, since the driver is the driving subject, it is possible to perform the cause analysis reliably by interviewing the driver.

<Second Decision Pattern>

Next, a second decision pattern will be described. The second decision pattern decides whether to allow or suppress execution of a lane change on the basis of results of determination by each of the detection state determiner 154 and the storage status determiner 156. "Allowing execution" means, for example, to permit the execution if an execution condition is satisfied.

Figure 5:
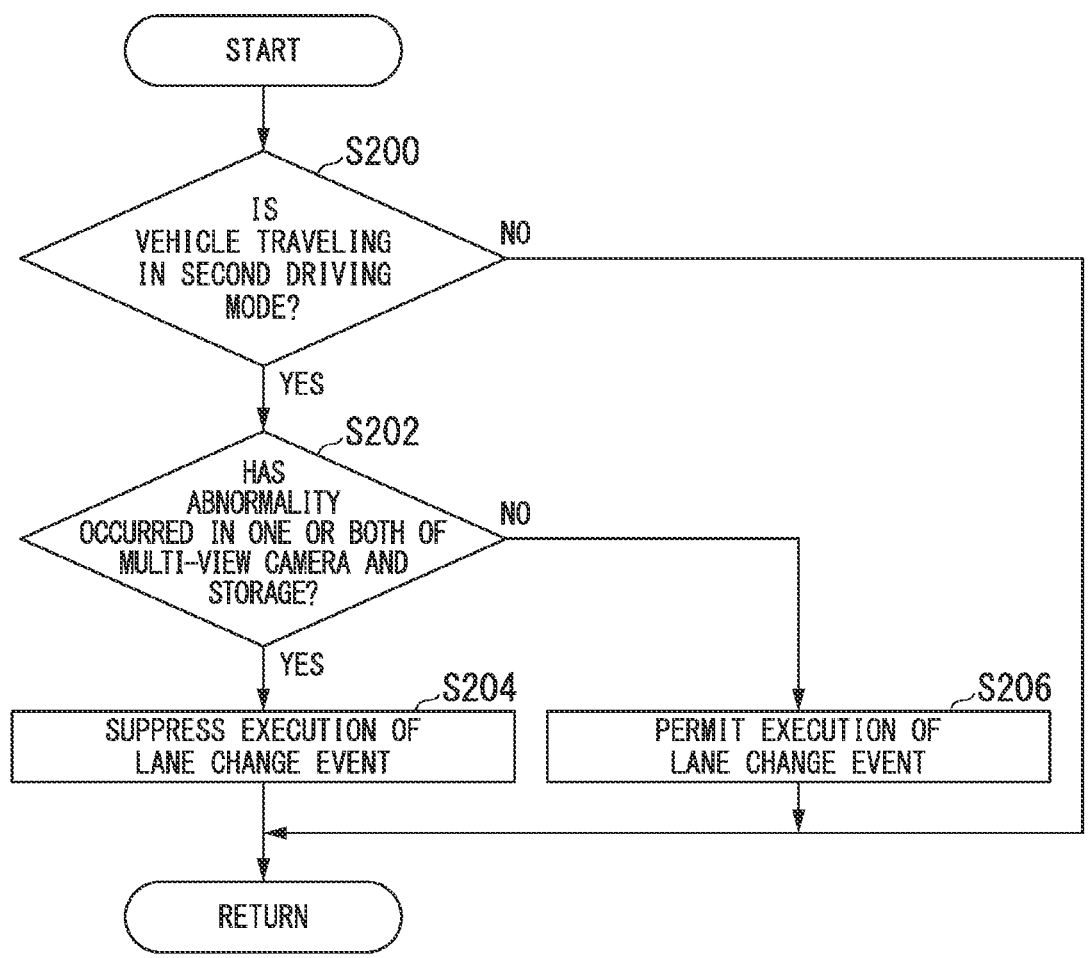
FIG. 5 is a flowchart which shows an example of processing in a second decision pattern.

FIG. 5 is a flowchart which shows an example of processing in the second decision pattern. In the second decision pattern, the mode decider 150 determines whether the vehicle M is traveling in the second driving mode (step S200). When it is determined that the vehicle M is traveling in the second driving mode, the mode decider 150 determines whether an abnormality has occurred in the multi-view camera 18 or the storage 190 (step S202). When it is determined that an abnormality has occurred in the multi-view camera 18 or the storage 190, an execution of a lane change event (one or both of a first lane change and a second lane change) is suppressed (step S204). Moreover, when it is determined that there is no abnormality in the surrounding status detector SD or the storage 190, the mode decider 150 permits the execution of the lane change event (step S206). When it is determined after the processing of steps SS04 and S206 or in the processing of step S200 that the vehicle is not traveling in the second driving mode, this flowchart is completed.

According to the second decision pattern described above, when an abnormality has occurred in the multi-view camera 18 or the storage 190, it is possible to suppress the execution of the lane change event, which has a high degree of control on the system side. As a result, even if there is a contact between the vehicle M and an object during the execution of the lane change event, it is possible to prevent a state in which the data log information is not stored in the storage 190.

In the second decision pattern, when it is determined that an abnormality has occurred in the multi-view camera 18 or the storage 190, at least one of the first to third lane changes included in the lane change event may be suppressed. Specifically, the mode decider 150 suppresses an execution of at least one of the first to third lane changes included in the lane change event in the processing of step S204 shown in FIG. 5. In this case, the mode decider 150 may suppress the execution of at least the first and second lane changes, which are lane changes driven by the system, and permit the execution of the third lane change driven by the driver (driver's intention). As a result, it is possible to perform lane changes according to the driver's intention, and to perform more appropriate driving control.

<Third Decision Pattern>

Next, a third decision pattern will be described. The third decision pattern allows a change in mode according to content of an abnormality state in the multi-view camera 18.

FIG. 6 is a flowchart which shows an example of processing in the third decision pattern. In the third decision pattern, the mode decider 150 determines whether the vehicle M is traveling in the first driving mode (step S300). When it is determined that the vehicle M is traveling in the first driving mode, the mode decider 150 determines whether an abnormality has occurred in the multi-view camera 18 (step S302). When it is determined that an abnormality has occurred in the multi-view camera 18, the mode decider 150 switches the driving mode of the vehicle M from the first driving mode to the mode C or subsequent modes of the second driving mode to cause the vehicle M to travel (step S304). In the following description, it is assumed that the driving mode of the vehicle M is switched to the mode D.

Next, the mode decider 150 determines whether content of the abnormality having occurred in the multi-view camera 18 satisfies a predetermined condition (step S306). The predetermined condition is, for example, that the abnormality of the multi-view camera 18 has weakened (degraded) the performance of the camera 10 and a degree of weakening is equal to or less than a threshold value. For example, even if performance of the camera 10 capable of imaging up to a position 100 [m] ahead of the vehicle M under normal conditions is weakened, when it is possible to image up to a position 50 [m] ahead of the vehicle M, the mode decider 150 determines that the content of the abnormality satisfies a predetermined condition (50 [m] is an example indicating that the degree of weakening is equal to or less than the threshold value). Factors that weaken the performance may include, for example, a peripheral environment (weather) or the like of the vehicle M as well as the abnormality of the apparatus itself.

When it is determined that the content of the abnormality satisfies a predetermined condition, the mode decider 150 allows switching of the mode of the vehicle M from the mode D to the mode C when a current driving mode of the vehicle M is the mode D (step S308). In the processing of step S308, the mode decider 150 causes the vehicle M to travel by switching the driving mode from the mode D to the mode C when, for example, a task condition imposed on the occupant and the surrounding status of the vehicle M satisfy conditions for executing the mode C. In addition, even if the conditions for executing the mode C are satisfied, when an instruction to execute the mode C is not received from the driver or the like, the mode decider 150 causes the vehicle M to travel in the mode D without switching it to the mode C. As a result, the processing of this flowchart is completed. Moreover, when it is determined in the processing of step S300 that the vehicle M is not traveling in the first driving mode, when it is determined in the processing of step S302 that an abnormality has occurred in the multi-view camera 18, or when it is determined in the processing of step S306 that the content of the abnormality does not satisfy the predetermined condition, the processing of this flowchart is completed.

According to the third decision pattern described above, even after an abnormality has occurred in the multi-view camera 18, and the driving mode is switched to a mode with a greater task imposed on the occupant (a mode with a low degree of automation), when the content of the abnormality satisfies the predetermined condition that ensures a certain degree of performance, it is possible to cause the vehicle to travel in a more appropriate mode by switching the switched mode to a mode with a smaller task imposed on the occupant (a mode with a higher degree of automation).

<Fourth Decision Pattern>

Next, a fourth decision pattern will be described. The fourth decision pattern determines a mode based on content of an abnormality of the storage 190.

FIG. 7 is a flowchart which shows an example of processing in the fourth decision pattern. In the fourth decision pattern, the mode decider 150 determines whether the vehicle M is traveling in the first driving mode (step S400). When it is determined that the vehicle M is traveling in the first driving mode, the mode decider 150 determines whether an abnormality has occurred in the storage 190 (step S402). When it is determined that an abnormality has occurred in the storage 190, the mode decider 150 determines whether the abnormality is an abnormality in the second storage area 194 (step S404). When it is determined that the abnormality is an abnormality in the second storage area 194, the mode decider 150 switches the driving mode from the first driving mode to the second driving mode to cause the vehicle to travel (step S406). In the processing of step S406, the mode decider 150 switches the driving mode to, for example, the mode C or the mode D in which the driver is the driving subject.

When it is determined in the processing of step S404 that the abnormality is not an abnormality in the second storage area 194, it is determined that the abnormality is an abnormality in the first storage area 192, and the mode decider causes the vehicle M to travel by switching the driving mode from the first driving mode to the mode C of the second driving mode (step S408). Next, the mode decider 150 allows switching from the mode C to the mode B (step S410). In the processing of step S410, the mode decider 150 causes the vehicle M to travel by switching from the mode C to the mode B when, for example, the task conditions imposed on the occupant and the surrounding status of the vehicle M satisfy conditions for executing the mode B. As a result, the processing of this flowchart is completed. When the vehicle M is not traveling in the first driving mode in the processing of step S400, or when there is no abnormality in the storage 190 in the processing of step S402, the processing of this flowchart is completed.

According to the fourth decision pattern described above, when an abnormality has occurred in the storage 190, it is possible to switch to a mode in which the driver is the driving subject. In addition, it is possible to cause the vehicle M to travel in a more appropriate driving mode according to a status of the vehicle by suppressing switching to a mode with a higher degree of automation after switching to a mode with a lower degree of automation when there is an abnormality in the second storage area where overwriting is not possible, and allowing switching to a mode with a higher degree of automation after switching to a mode with a lower degree of automation when there is an abnormality in the first storage area where overwriting is possible.
<Fifth Decision Pattern>

Next, a fifth decision pattern will be described. In the fifth decision pattern, the mode decider 150 causes the vehicle M to travel in a mode in which a task imposed on the driver (occupant) of the vehicle M is equal to or greater than a threshold value (a mode in which the degree of automation is equal to or less than a threshold value) when an abnormality has occurred in both of the multi-view camera 18 and the storage 190. Specifically, the mode decider 150 causes the vehicle M to travel in the mode C and the subsequent modes (the modes C, D, and E).

According to the fifth decision pattern described above, when an abnormality has occurred in the multi-view camera 18 and the storage 190, the vehicle M is caused to travel in a mode in which the driver is a driving subject, thereby when the vehicle M is in contact with an object in this case, it can be clarified that the driver is the driving subject even if the data log information is not stored in the storage 190.
<Sixth Decision Pattern>

Next, a sixth decision pattern will be described. In the sixth decision pattern, before the vehicle M executes the first driving mode and the second driving mode, when an abnormality has occurred in one or both of the multi-view camera 18 and the storage 190, the mode decider 150 decides not to execute the first driving mode and the second driving mode. In this case, the vehicle M travels by manual driving (the mode E).

According to the sixth decision pattern described above, it is possible to suppress automated driving and driving assistance when an abnormality has occurred in the function for storing data log information before the first driving mode and the second driving mode are executed.

Note that each of the first to sixth decision patterns described above may be combined with a part or all of other decision patterns.

According to the embodiments described above, for example, when an abnormality in the drive recorder function is detected, it is possible to cause a vehicle to travel under more appropriate driving control by switching to a driving mode with a greater task imposed on the occupant. As a result, even if the vehicle comes into contact with an object and the data log information is not stored, since a driving subject is a driver, it is possible to reliably analyze a cause by interviewing the driver.

In the embodiments described above, a driving mode when the task imposed on an occupant does not include the occupant monitoring the surroundings of the vehicle M or the occupant performing steering gripping may be set as the first driving mode. In addition, in the embodiments described above, a driving mode when the task imposed on an occupant includes monitoring the surroundings of the vehicle M or performing steering gripping may also be set as the second driving mode.

The embodiments described above can be expressed as follows.

A vehicle control device includes a storage device that has stored a program, and a hardware processor, in which the hardware processor executes the program, thereby recognizing a surrounding status of a vehicle, controlling one or both of steering and acceleration or deceleration of the vehicle on the basis of the recognized surrounding status or map information, storing images of the surroundings of the vehicle captured by a peripheral camera mounted on the vehicle in a storage, causing the vehicle to travel in any one of a plurality of driving modes including a first driving mode and a second driving mode in which a task imposed on an occupant of the vehicle is greater than that in the first driving mode, causing the vehicle to travel by switching from the first driving mode to the second driving mode when an abnormality has occurred in one or both of the peripheral camera and the storage in the first driving mode, and continuing the second driving mode when an abnormality has occurred in one or both of the peripheral camera and the storage in the second driving mode.

Although a mode for carrying out the present invention has been described above using the embodiment, the present invention is not limited to the embodiment, and various modifications and substitutions can be made within a range not departing from the gist of the present invention.

REFERENCE SIGNS LIST

1 Vehicle system
10 Camera
12 Radar device
14 LIDAR
16 Object recognition device
18 Multi-view camera
20 Communication device
30 HMI
32 Turn signal switch
40 Vehicle sensor
50 Navigation device
60 MPU
70 Drive monitor camera
80 Driving operator
82 Steering wheel
84 Steering grip sensor
100 Automated driving control device
120 First controller
130 Recognizer
140 Action plan generator
150 Mode decider
152 Driver state determiner
154 Detection state determiner
156 Storage status determiner
158 Mode change processor
160 Second controller
162 Acquirer
164 Speed controller
166 Steering controller
170 HMI controller
180 Storage controller
190 Storage
200 Traveling drive force output device
210 Brake device
220 Steering device

What is claimed is:

1. A vehicle control device comprising:
a processor that executes instructions to:
recognize a surrounding status of a vehicle;
control one or both of steering and acceleration or deceleration of the vehicle on the basis of the surrounding status or map information;
store, to a storage, images of the surroundings of the vehicle captured by a peripheral camera mounted on the vehicle; and
control the storage,
wherein the processor causes the vehicle to travel in one of a plurality of driving modes with different tasks imposed on an occupant of the vehicle, the plurality of driving modes are divided into a first driving mode and a second driving mode in which a task imposed on the occupant of the vehicle is greater than that in the first driving mode, the second driving mode includes a plurality of modes with different degrees of automation, the processor causes the vehicle to travel by switching from the first driving mode to the second driving mode when an abnormality has occurred in one or both of the peripheral camera and the storage in the first driving mode, switches to a predetermined mode among a plurality of modes of the second driving mode when an abnormality has occurred in the peripheral camera, determines a degree of performance degradation due to the abnormality of the peripheral camera in which the abnormality has occurred, when the degree of performance degradation is equal to or less than a threshold value, allows a change to a mode with a higher degree of automation that the predetermined mode switched among the plurality of modes included in the second operation mode, reevaluates the determination of the degree of performance degradation due to the abnormality of the peripheral camera to ensure that the change to the mode with the higher degree of automation is an appropriate mode among the plurality of modes included in the second operation mode; and based on a reevaluation of the degree of performance degradation, switches the mode with the higher degree of automation to be the appropriate mode.

2. The vehicle control device according to claim 1, wherein the task imposed on the occupant in the second driving mode includes monitoring the surroundings of the vehicle or gripping an operator that receives a steering operation of the vehicle by the occupant.

3. The vehicle control device according to claim 1, wherein the task imposed on the occupant in the first driving mode does not require monitoring the surroundings of the vehicle and gripping an operator for receiving a steering operation of the vehicle by the occupant.

4. The vehicle control device according to claim 1, wherein the second driving mode includes a function of causing the vehicle to change lanes from a host lane in which the vehicle is traveling to an adjacent lane adjacent to the host lane, and the processor suppresses execution of the function of causing the vehicle to change lanes when an abnormality has occurred in the peripheral camera or the storage, and allows the execution of the function of causing the vehicle to change lanes when there is no abnormality in the peripheral camera and the storage.

5. The vehicle control device according to claim 4, wherein the function of causing the vehicle to change lanes includes a first lane change in which the processor plans a lane change of the vehicle and decides a start of the lane change of the vehicle to cause the vehicle to change lanes, a second lane change in which the processor plans a lane change of the vehicle and the occupant instructs the lane change of the vehicle to cause the vehicle to change lanes, and a third lane change in which the occupant plans a lane change of the vehicle and instructs a start of the lane change to cause the vehicle to change lanes, and the processor suppresses execution of one or both of the first lane change and the second lane change when an abnormality has occurred in the peripheral camera or the storage.

6. The vehicle control device according to claim 1, wherein the processor switches from the first driving mode to the second driving mode when a predetermined abnormality has occurred in the peripheral camera and then allows the vehicle to travel by switching to a driving mode with a smaller task imposed on the occupant among the plurality of modes included in the second driving mode according to content of the abnormality.

7. The vehicle control device according to claim 1, wherein the storage includes a first storage area in which overwriting storage of information including an image captured by the peripheral camera is permitted, and a second storage area in which overwriting storage of the information is not permitted, and the processor causes the vehicle to travel by switching the first driving mode to the second driving mode when there is no predetermined abnormality in the peripheral camera and when an abnormality has occurred in the second storage area in the first driving mode.

8. The vehicle control device according to claim 7, wherein the second driving mode includes a plurality of modes with different degrees of automation, and the processor switches from the first driving mode to a predetermined mode among the plurality of modes of the second driving mode when there is no predetermined abnormality in the peripheral camera and when an abnormality has occurred in the first storage area in the first driving mode, and then allows the vehicle to travel by switching to the mode with the higher degree of automation than the predetermined mode among the plurality of modes included in the second driving mode.

9. The vehicle control device according to claim 6, wherein the driving mode with a small task imposed on the occupant among the plurality of modes included in the second driving mode includes a mode that does not require gripping of an operator that receives a steering operation by the occupant.

10. The vehicle control device according to claim 1, wherein the second driving mode includes a plurality of modes with different tasks imposed on the occupant, and the processor causes the vehicle to travel in a mode in which a degree of the task imposed on the occupant is equal to or greater than a predetermined degree when an abnormality has occurred in the peripheral camera and the storage.

11. The vehicle control device according to claim 1, wherein the processor does not execute the first driving mode and the second driving mode when an abnormality has occurred in one or both of the peripheral camera and the storage before the first driving mode and the second driving mode are executed.

12. A vehicle control method comprising:
by a computer,
recognizing a surrounding status of a vehicle;
controlling one or both of steering and acceleration or deceleration of the vehicle on the basis of the recognized surrounding status or map information;
causing a storage to store images of the surroundings of the vehicle captured by a peripheral camera mounted on the vehicle;

causing the vehicle to travel in one of a plurality of driving modes with different tasks imposed on an occupant of the vehicle;

dividing the plurality of driving modes into a first driving mode and a second driving mode in which a task imposed on the occupant of the vehicle is greater than that in the first driving mode;

including, by the second driving mode, a plurality of modes with different degrees of automation;

causing, the vehicle to travel by switching from the first driving mode to the second driving mode when an abnormality has occurred in one or both of the peripheral camera and the storage in the first driving mode;

switching to a predetermined mode among a plurality of modes of the second driving mode when an abnormality has occurred in the peripheral camera, determining a degree of performance degradation due to the abnormality of the peripheral camera in which the abnormality has occurred, when the degree of performance degradation is equal to or less than a threshold value, allowing a change to a mode with a higher degree of automation than the predetermined mode among the plurality of modes included in the second operation mode;

reevaluating the determination of the degree of performance degradation due to the abnormality of the peripheral camera to ensure that the change to the mode with the higher degree of automation is an appropriate mode among the plurality of modes included in the second operation mode; and based on the reevaluating, switching the mode with the higher degree of automation to be the appropriate mode.

* * * * *